(12) United States Patent
Sarris et al.

(10) Patent No.: US 7,980,464 B1
(45) Date of Patent: Jul. 19, 2011

(54) BANK CARD FRAUD PROTECTION SYSTEM

(75) Inventors: Helen Sarris, Burlington, NJ (US);
Timothy B. Byrd, Charlotte, NC (US);
Rhonna J. Clark, Charlotte, NC (US);
Chuan Bin Lin, Richardson, TX (US);
Daniel P. Shnowske, Waxahachie, TX (US); William Treadwell, Addison, TX (US); Mian Zhou, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 260 days.

(21) Appl. No.: 12/343,036

(22) Filed: Dec. 23, 2008

(51) Int. Cl.
*G06Q 40/00* (2006.01)
*G07D 11/00* (2006.01)
*G07F 19/00* (2006.01)

(52) U.S. Cl. .............. 235/379; 705/43; 705/44

(58) Field of Classification Search .......... 235/379, 235/380; 705/35, 39, 42–44; 340/568.7, 340/539.13, 825.49
See application file for complete search history.

(56) References Cited

U.S. PATENT DOCUMENTS

| | | | | |
|---|---|---|---|---|
| 5,130,519 A * | 7/1992 | Bush et al. | ...... | 235/380 |
| 5,354,974 A * | 10/1994 | Eisenberg | ...... | 235/379 |
| 5,731,575 A * | 3/1998 | Zingher et al. | ...... | 235/379 |
| 6,679,422 B2 * | 1/2004 | Brown et al. | ...... | 235/379 |
| 6,685,087 B2 * | 2/2004 | Brown et al. | ...... | 235/380 |
| 7,004,387 B1 * | 2/2006 | Kaimikaua et al. | ...... | 235/380 |
| 7,357,307 B1 * | 4/2008 | Block et al. | ...... | 235/379 |
| 7,415,720 B2 * | 8/2008 | Jung | ...... | 726/2 |
| 7,497,371 B1 * | 3/2009 | Sparks | ...... | 235/379 |
| 7,549,574 B2 * | 6/2009 | Crowell et al. | ...... | 235/379 |
| 7,552,467 B2 * | 6/2009 | Lindsay | ...... | 726/5 |
| 7,595,815 B2 * | 9/2009 | Donovan et al. | ...... | 348/143 |
| 2002/0070874 A1 * | 6/2002 | Williams et al. | ...... | 340/825.49 |
| 2003/0195850 A1 * | 10/2003 | Stallworth | ...... | 705/43 |
| 2004/0158523 A1 * | 8/2004 | Dort | ...... | 705/42 |
| 2006/0118624 A1 * | 6/2006 | Kelso et al. | ...... | 235/444 |
| 2008/0251578 A1 * | 10/2008 | Jansing | ...... | 235/379 |
| 2010/0169151 A1 * | 7/2010 | Xu | ...... | 705/9 |

\* cited by examiner

*Primary Examiner* — Michael G Lee
*Assistant Examiner* — Suezu Ellis
(74) *Attorney, Agent, or Firm* — Michael A. Springs; Moore & Van Allen PLLC (57) ABSTRACT

Systems and methods are provided for protecting against bank card fraud and related crimes by providing a distress/fraud trigger at bank card machines, such as automated teller machines and point-of-sale terminals. The trigger initiates certain heightened-security processes designed to stop the crime, control damage, and help apprehend the criminal. For example, in one embodiment, the trigger involves the cardholder inputting a "panic" personal identification code into the bank card machine. The panic personal identification code indicates to a party involved in the bank card transaction that a fraudulent transaction may be taking place. The heightened-security processes may include, for example, displaying that the bank card machine is out-of-order, dispensing money with a GPS tracking device, requesting additional identification steps, instituting delay tactics, notifying on-site personnel, or forwarding audio or video information from the bank card machine to a bank's command center in real time or near real time.

25 Claims, 4 Drawing Sheets

BANK CARD FRAUD PROTECTION SYSTEM

FIELD

In general, embodiments of the invention relate to bank card fraud protection systems, and, more particularly, to systems, methods, and computer program products for providing a distress/fraud trigger at bank card machines.

BACKGROUND

Bank cards, including credit and debit cards, are used by cardholders to make purchases, cash withdrawals, and other financial transactions at bank card machines, such as automated teller machines (ATMs), point-of-sale (POS) terminals, and the like. For example, a typical bank card has a magnetic strip that holds information about a credit or debit account. The cardholder can then access the credit or debit account by, for example, swiping the bank card by a magnetic strip reader on the bank card machine.

Since much of the transaction is automated and takes place between the cardholder and a machine, if a person steals or otherwise obtains the bank card from the cardholder, the person may be able to use the bank card at a bank card machine to make fraudulent transactions using the credit or debit account associated with the card. To prevent these types of fraudulent transactions, many financial institutions and bank card machine owners require that a cardholder enter a personal identification number (PIN) after they swipe the bank card at a bank card machine. The cardholder is asked to memorize the PIN and keep it secret so that only the cardholder and those authorized by the cardholder can use the bank card at a bank card machine.

The PIN, however, cannot prevent all fraudulent transactions. For example, robberies at ATMs are sometimes a problem, where the criminal forces the cardholder to swipe the bank card, enter the PIN, and withdraw money for the criminal. In another example, the criminal may steal the bank card and force the cardholder to provide his or her PIN. The criminal may then locate an ATM, or other bank card machine, and quickly withdraw money or make several purchases using the stolen bank card and PIN. Therefore, systems and methods are needed to further prevent bank card related crimes and fraudulent transactions.

SUMMARY

Systems, methods, and computer program products are provided for protecting against bank card fraud and related crimes by providing a distress/fraud trigger at bank card machines, such as automated teller machines and/or point-of-sale terminals. The distress/fraud trigger initiates certain heightened security processes designed to stop the crime, limit damage from the crime, and help apprehend the criminal. For example, in one embodiment, the trigger involves the cardholder inputting a "panic" personal identification code into the bank card machine, where the panic personal identification code indicates to a party involved in the bank card transaction that a fraudulent transaction and/or other crime may be taking place.

More particularly, embodiments of the invention provide a computer-implemented method comprising: (1) receiving account identification information entered at a bank card machine; (2) receiving a personal identification code entered at a bank card machine; (3) using the account identification information to identify a bank account; (4) determining whether the received personal identification code matches a first personal identification code associated with the bank account; and (5) initiating a fraud protection procedure if it is determined that the received personal identification code matches the first personal identification code, wherein the fraud protection procedure comprises making the bank card machine unavailable to a user of the bank card machine, dispensing money with a Global Positioning System (GPS) tracking device, requesting additional identification steps from the user, instituting delay tactics, notifying employees of the bank card machine owner or holder, or forwarding audio or video information captured in close proximity to the bank card machine to a device configured to display the video or play the audio in real time or near real time.

In one embodiment, where the fraud protection procedure includes making the bank card machine unavailable to a user of the bank card machine, making the bank card machine unavailable to the user involves displaying that the bank card machine is out of order after receiving the personal identification code but before permitting a transaction involving the bank account. In another embodiment, where the fraud protection procedure includes making the bank card machine unavailable to a user of the bank card machine, making the bank card machine unavailable to the user involves displaying that the bank card machine is out of order after permitting a transaction involving the bank account.

In one embodiment, the bank card machine comprises a point-of-sale terminal and the fraud protection procedure comprises requesting additional identification steps from the user. For example, in one embodiment, requesting additional identification steps from the user involves prompting a teller or cashier to request additional identification from the user of the bank card machine. In other embodiments, requesting additional identification steps from the user involves requesting that the user of the bank card machine answer one or more additional security questions.

In one embodiment, where the fraud protection procedure includes instituting delay tactics, the delay tactics involve requiring additional steps to complete a transaction at the bank card machine. In some embodiments, the delay tactics involve delaying completion of one or more steps occurring during a transaction requested at a bank card machine.

In one embodiment, where the fraud protection procedure includes notifying employees of the bank card machine owner or holder, the employees of the bank card machine owner or holder are located at or in close proximity to the site of the bank card machine.

In one embodiment, where the fraud protection procedure includes forwarding audio or video information captured in close proximity to the bank card machine to a device configured to display the video or play the audio in real time or near real time, the device is located at a security agency, a financial institution that maintains the bank account, or an institution that maintains the bank card machine. In such an embodiment, the fraud protection procedure may further include activating a security camera, activating a zoom feature of a security camera, reorienting a security camera, recording higher resolution images from a security camera, activating a microphone, or recording higher quality audio from a microphone.

Embodiments of the invention further provide a computer-implemented method involving: (1) receiving account identification information; (2) receiving a personal identification code from a user of a bank card machine; (3) using the account identification information to identify a bank account; (4) determining whether the received personal identification code matches a first personal identification code associated with the bank account; (4) performing a verification procedure to determine whether the user intended to enter a personal identification code that matches the first personal identification code, if it is determined that the received personal identification code matches the first personal identification code; and (5) initiating one or more fraud protection procedures, if it is determined that the received personal identification code matches the first personal identification code and if it is determined through the verification procedure that the user intended to enter a personal identification code that matches the first personal identification code.

In one embodiment, the verification procedure involves displaying a reduced balance that is significantly lower than the actual balance of the bank account, and determining that the user intended to enter a personal identification code that matches the first personal identification code if the user continues with a transaction after the reduced balance is displayed. In some embodiments, the verification procedure further involves asking the user, after the displaying of the reduced balance, if the user would like to continue with the transaction.

In one embodiment, the method further involves determining whether the received personal identification code matches a second personal identification code, and then allowing standard user access to the bank account if the personal identification code matches the second personal identification code and does not match the first personal identification code.

In one embodiment of the method, receiving account identification information and the personal identification code comprises receiving account identification information and the personal identification code from a remote bank card machine. In some embodiments, the method is performed by a financial institution that maintains the bank account. In other embodiments, the method is performed by a bank card machine.

Embodiments of the invention further provide a system comprising a communication interface, a memory device, and a processor. The communication interface is communicably coupled to a bank card machine and is configured to receive bank card information and a personal identification code from the bank card machine. The memory device includes information stored therein about a plurality of bank accounts including a first personal identification code and a second personal identification code associated with each of the plurality of bank accounts. The processor is operatively coupled to the communication interface and the memory device. The processor is configured to identify a bank account from the plurality of bank accounts based on the received bank card information. The processor is further configured to compare the received personal identification code with the first and second personal identification codes associated with the identified bank account, The processor is further configured to initiate one or more security procedures if the received personal identification code matches the second personal identification code associated with the identified bank account. In one embodiment, the one or more security procedures include at least one of making the bank card machine unavailable to a user of the bank card machine, dispensing money with a Global Positioning System (GPS) tracking device, requesting additional identification steps from the user, instituting delay tactics, notifying employees of the bank card machine owner or holder, or forwarding audio or video information captured in close proximity to the bank card machine to a device configured to display the video or play the audio in real time or near real time.

In one embodiment, the system further includes a command center communicably coupled to a plurality of remote bank card machines. The command center is configured to receive audio or video information from a bank card machine in real time or near real time if the personal identification code received at the bank card machine matches the second personal identification code associated with the bank account associated with the bank card information received at the bank card machine.

Embodiments of the invention further provide a bank card machine having a user input device configured to receive bank account information and a personal identification code, a first source of money having regular bills, a second source of money having at least some bills associated with a tracking device; and a processor operatively coupled to the user input device. The processor is configured to use the bank account information and the personal identification code to determine whether the bank card machine is being used to attempt a fraudulent transaction. In one embodiment, the processor is further configured to dispense at least one bill from the second source of money if a determination is made that the bank card machine is being used to attempt a fraudulent transaction.

In one embodiment, the bank card machine comprises an automated teller machine, and the first source of money and the second source or money comprise a first safe and a second safe, respectively, located within the automated teller machine. In one embodiment, the tracking device includes a GPS device. In one embodiment, the processor is configured to use the bank account information and the personal identification code to determine that the bank card machine is being used to attempt a fraudulent transaction by sending at least a portion of the bank account information and the personal identification code to a financial institution identified by the bank account information and receiving an indication from the financial institution that the bank card machine is being used to attempt a fraudulent transaction.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, a "bank card" refers to a credit card, debit card, ATM card, check card, or the like, and a "bank account" refers to a credit account, debit account, deposit account, checking account, or the like. Although the phrases "bank card" and "bank account" include the term "bank," the card need not be issued by a bank, and the account need not be maintained by a bank and may instead be issued by and/or maintained by other financial institutions. As used herein, unless specifically limited by the context, the term "transaction" may refer to a purchase of goods or services, a withdrawal of funds, an electronic transfer of funds, a payment transaction, a credit transaction, or other transaction involving a bank account.

Figure 1:
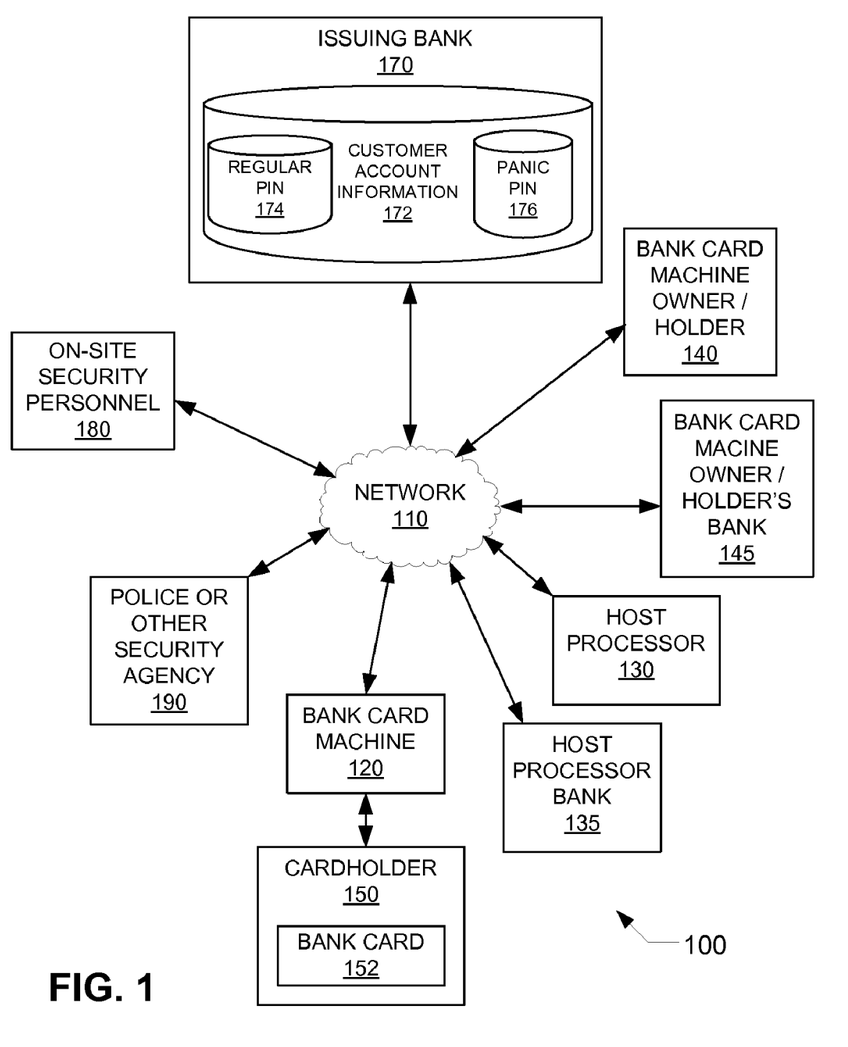
FIG. 1 provides a block diagram illustrating an environment in which an embodiment of the bank card fraud protection system may exist, in accordance with an embodiment of the invention.

FIG. 1 illustrates an environment 100 in which an embodiment of the bank card fraud protection system may exist, in accordance with an embodiment of the invention. As illustrated in FIG. 1, the system generally involves a cardholder 150 holding a bank card 152. As described above, the bank card 152 may be a credit card, debit card, ATM card, or other type of card that can be used to make a transaction involving an account maintained by an issuing bank 170. Although the invention is generally described herein as involving a bank card, other embodiments of the invention may involve other transaction devices that can be used by a device holder to make a transaction involving an account associated with the transaction device. For example, in one embodiment, instead of a card, the transaction device comprises a mobile telephone transmitting a radio frequency (RF) signal encoded with account identification information.

The bank card 152 is associated with a particular customer's account maintained by the issuing bank 170. In a typical bank card transaction, the cardholder 150 is the customer who owns the account maintained by the issuing bank 170. However, in other bank card transactions or attempted bank card transactions, the cardholder 150 is not the customer. For example, the customer could hand the bank card 152 to a friend or family member and allow them to make a transaction with the bank card 152, in which case the friend or family member would be the "cardholder." In another example, the customer is a victim of a robbery where the robber steals the customer's bank card 152 and then attempts to make a transaction with the bank card 152.

The issuing bank 170 is the bank or other financial institution that maintains the customer's bank account, which, as described above, may be a credit account, debit account, or other account. As such, the issuing bank 170 is also, typically, the financial institution that issues the bank card 152. In this regard, the issuing bank 170 includes a memory system housing a datastore of customer account information 172. The customer account information 172 generally includes an account number, an account balance, transaction information about previous transactions, and/or other financial and non-financial information about the customer and the customer's account. As described in greater detail below, embodiments of the present invention permit the customers to have a first "regular" PIN and a second "panic" PIN. As such, the customer account information 172 for a particular customer's account will generally also include a regular PIN 174 and a panic PIN 176. In one embodiment, the PIN is a string of numbers, such as a string of four or six numbers. In other embodiments, however, the PIN may not be a number at all and may include a string of alphabetic or alphanumeric characters and/or other symbols and characters. As such, the PIN is, from time to time, referred to herein as a "personal identification code" instead of a "personal identification number."

The issuing bank 170 generally also includes a network interface for communicating with a network 110, as well as a processor. In some embodiments, the issuing bank 170 includes a heightened security "panic" computer-based application stored in the memory system that includes computer-readable instructions for instructing the processor to perform one or more of the functions and procedures described herein in FIGS. 3 and 4.

The system generally also includes a bank card machine 120. In one embodiment, the bank card machine 120 is an ATM. In other embodiments, the bank card machine 120 is a point-of-sale terminal, such as a bank card terminal at the register of a grocery store or a pay-at-the-pump terminal at a gas station. In still other embodiments, the bank card machine 120 is another device, such as a personal computer or mobile computing device, that is configured to read account identification information from a bank card 152 and initiate a financial transaction involving the bank account associated with the bank card 152.

The bank card machine 120, described in greater detail below, is configured to communicate with the issuing bank 170 via a network 110. The bank card machine 120 is owned, held, or otherwise associated with a bank card machine owner/holder 140. In one embodiment, the bank card machine owner/holder 140 is the issuing bank 170. For example, many banks have their own ATMs. In such an embodiment, the bank card machine 120 may communicate directly with the issuing bank 170 over the network 110 or through one or more other entities.

In other embodiments, however, the bank card machine owner/holder 140, is another bank or financial institution, a merchant, or the like. In such embodiments, the bank card machine 120 may communicate with the issuing bank 170 through the bank card machine owner/holder 140, the bank card machine owner/holder's bank 145, and/or one or more other entities.

The bank card machine owner/holder 140 may have a bank 145 that maintains a bank account for the bank card machine owner/holder 140. The bank card machine owner/holder's bank 145 may be the same as or different from the issuing bank 170. For example, where the bank card machine 120 is a POS terminal at a merchant's store, the bank card machine owner/holder 140 may be the merchant, and the bank card machine owner/holder's bank 145 may be the receiving bank that maintains the merchant's account and obtains payment from the issuing bank 170 for bank card purchases made at the merchant's store.

In another example, the bank card machine 120 is a kiosk-style ATM owned or leased by a merchant, such as a gas station or convenience store. In such an embodiment, although the merchant 140 may provide the money in the bank card machine 120, the bank card machine 120 may be operated by a host processor 130. In such an embodiment, the bank card machine 120 may communicate with the issuing bank 170 through the host processor 130. Where the transaction involves a withdrawal of cash from the bank card machine 120, the issuing bank 170 transfers funds to the host processor's bank 135 via, for example, an electronic funds transfer, and the host processor bank 135 then ACHs the funds to the merchant's bank account maintained by the merchant's bank 145. In this way, the merchant 140 is reimbursed for the funds dispensed at the bank card machine 120.

As further illustrated in FIG. 1, embodiments of the invention may also involve on-site security personnel 180 and/or the police or other security/public safety agency 190. Numerous other entities may also be involved in embodiments of the present invention, but are not shown in FIG. 1 for the sake of clarity. For example, the system may involve an automated clearing house and/or one or more other financial institutions involved in processing bank card transactions, such as POS purchase transactions and ATM transactions.

Furthermore, although only a single representation of a network 110 is illustrated in FIG. 1, the network 110 may comprise a plurality of separate and discrete networks. For example, the network 110 that is used to communicate information between the issuing bank 170 and the bank card machine 120 may be the same or different than the network 110 used to communicate information between the issuing bank 170 and the police or other security agency 190. The network 110 may include a local area network (LAN), a wide area network (WAN), and/or a global area network (GAN). In this regard, the network 110 may include the Internet, an intranet, an extranet, a telephonic network, and/or a combination of these networks. The network 110 may also include a direct electrical, optical, or wireless connection between one or more of the entities and devices shown in FIG. 1.

Figure 2:
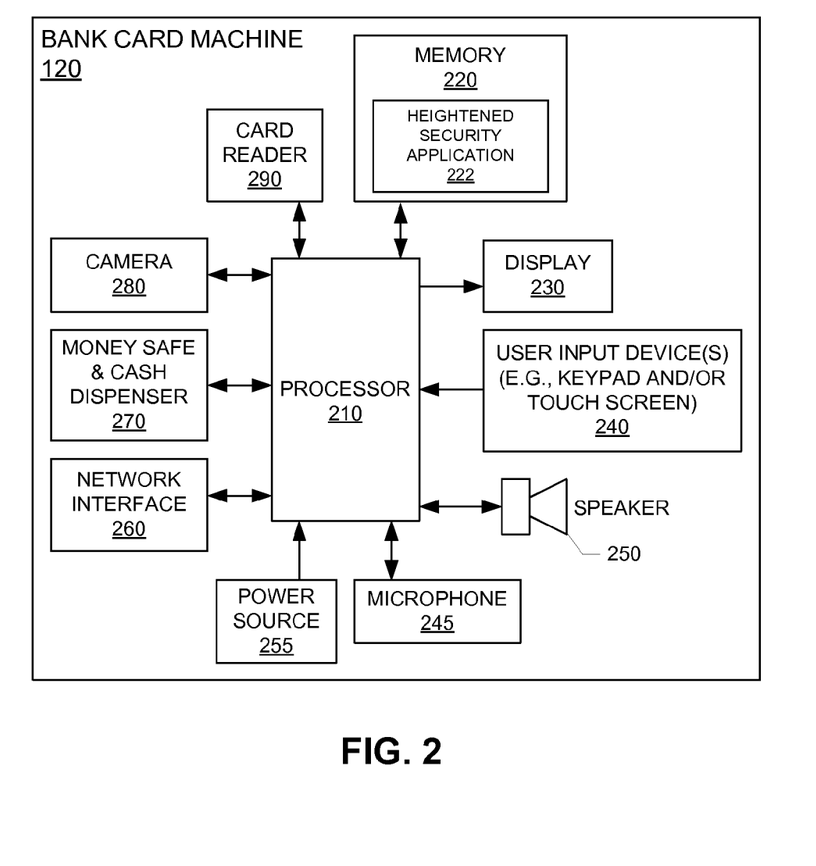
FIG. 2 provides a block diagram illustrating an exemplary bank card machine, in accordance with one embodiment of the present invention.

FIG. 2 provides a block diagram illustrating an exemplary bank card machine 120, such as an ATM, in accordance with one embodiment of the present invention. While several embodiments of a bank card machine 120 are described herein for purposes of example, other types of bank card machines 120 can readily employ embodiments of the present invention.

As illustrated in FIG. 2, the bank card machine 120 includes a processor 210. It is understood that the processor 210 includes circuitry required for implementing audio, visual, and logic functions of the bank card machine 120. For example, the processor 210 may be comprised of a digital signal processor device, a microprocessor device, and various analog-to-digital converters, digital-to-analog converters, and other support circuits. Control and signal processing functions of the bank card machine 120 are allocated between these devices according to their respective capabilities. The processor 210 may include functionality to operate one or more software programs based on computer-readable instructions thereof, which may be stored in memory 220. In one embodiment of the invention, the memory 220 includes a heightened security application 222 stored therein for instructing the bank card machine's to perform certain heightened security procedures in the event that a panic PIN is entered by a cardholder, as described in greater detail below. Some embodiments may include other computer programs. For example, the processor 210 may be capable of operating a connectivity program, such as a conventional Web browser. The connectivity program may then allow the bank card machine 120 to transmit and receive Web content, for example.

In general, the memory 220 is communicatively coupled to the processor 210. The memory 220 may include volatile memory, such as volatile Random Access Memory (RAM) including a cache area for the temporary storage of data. The bank card machine 120 may also include other non-volatile memory, which can be embedded and/or may be removable. The non-volatile memory can additionally or alternatively comprise an EEPROM, flash memory, or the like. The memories can store any of a number of pieces of information and data used by the bank card machine 120 to implement the functions of the bank card machine 120. For example, the memories can include an identifier, such as a serial number, capable of uniquely identifying the bank card machine 120 and/or the type of bank card machine 120.

The bank card machine 120 includes a communication interface including, for example, a network interface 260 and a user interface, operatively coupled to the processor 210. The network interface 260 may include a modem, server, or other electronic device that communicatively couples the bank card machine 120 to another electronic device or a network 110 of devices, such as a LAN, WAN, and/or GAN, such as the Internet. The network interface 260 may be configured for wireless or wireline communication. The user interface comprises one or more user output devices, such as a display 230 and a speaker 250 or other audio device (e.g., a ringer, buzzer, or bell). The user interface further comprises one or more user input devices 240, such as one or more keys or dials, a touch pad, keypad, touch screen, mouse, microphone 245, and/or the like.

The bank card machine 120 also includes a card reader 290 or other device for obtaining account identification information from a transaction device, such as a bank card. For example, a bank card 152 may have a magnetic strip encoded with account identification information, such as an account number. In such an example, the card reader 290 includes a magnetic strip reader for reading the account information encoded on the magnetic strip. In other embodiments, the bank card 152 may include other types of machine-readable code, such as RF code, barcode, two-dimensional barcode, optical code, infrared code, alphanumeric code, and/or the like. Likewise, the card reader 290 may include other types of machine-readable code readers, such as an RF reader, a barcode scanner, an optical receiver, an infrared receiver, an imaging device and character recognition software, and/or the like.

The bank card machine 120 may also include a camera 280, such as a security camera, or one or more other imaging devices. The camera 280 may be a video camera or a still camera, and the camera may be analog or digital. The camera 280 may include night vision capabilities, heat sensing capabilities, adjustable resolution capabilities, zoom capabilities, adjustable orientation capabilities, and/or the like. In one embodiment, the camera 280 is substantially hidden from the cardholder's view, but is directed generally to where the cardholder is located during an attempted transaction.

The bank card machine 120 generally also includes a money safe and cash dispenser 270 for providing cash to the cardholder 150 during certain transactions. For example, where the bank card machine 120 is an ATM, the money safe 270 includes a plurality of cash cassettes for holding large sums of money for the ATM. In another example, where the bank card machine 120 is a POS terminal, the money safe 270 may include a cash register configured to hold certain sums of money.

As further illustrated in FIG. 2, the bank card machine 120 includes a power source 255 for providing power to the various electronic components of the bank card machine 120. Other embodiments of the bank card machine 120 may include other devices and components not illustrated in FIG. 2, such as one or more lights that, in some embodiments are dimmable.

Figure 3:
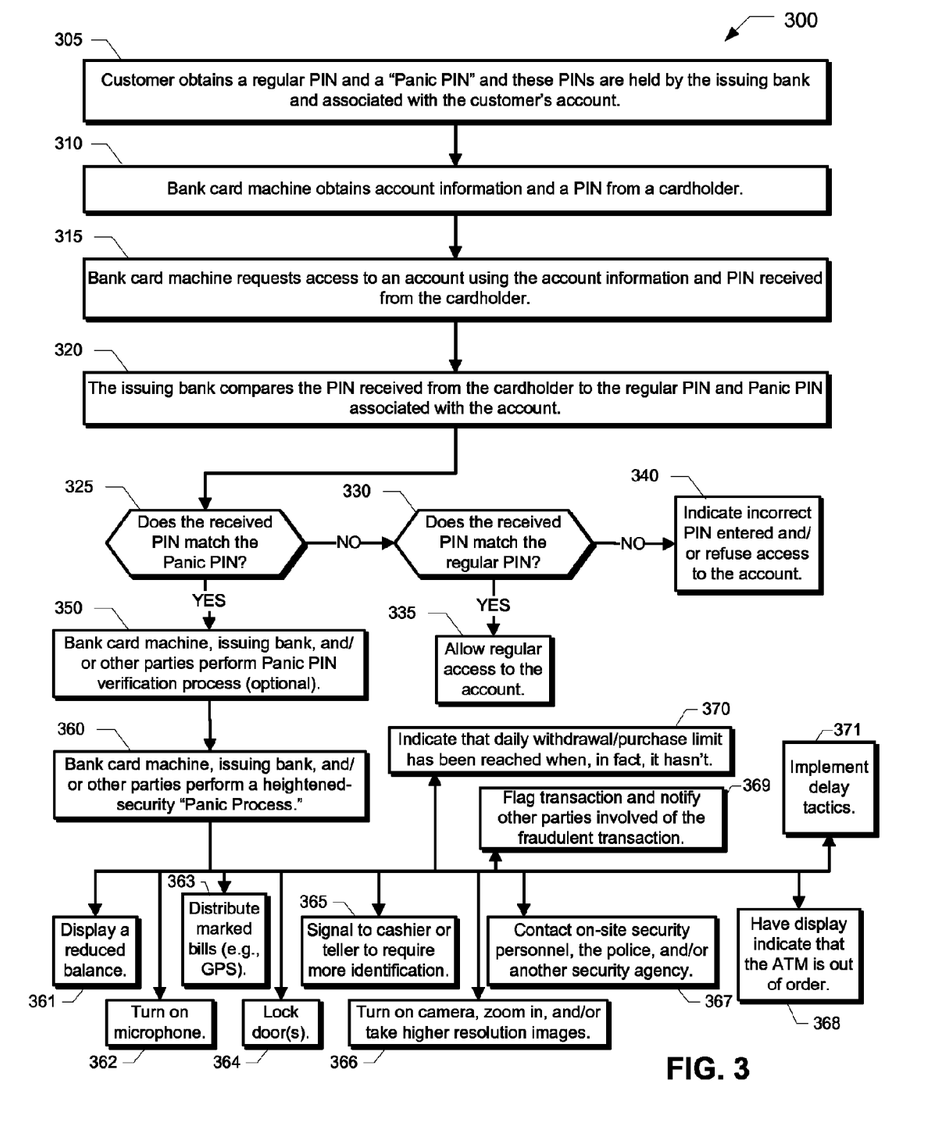
FIG. 3 provides a flow diagram illustrating a bank card fraud protection process, in accordance with an embodiment of the invention.

FIG. 3 provides a flow diagram illustrating a bank card fraud protection process 300, in accordance with an embodiment of the invention. As represented by block 305, a customer obtains a regular PIN and a "Panic PIN" and these PINS are held by the issuing bank 170 and associated with the customer's account. For example, in one embodiment, the issuing bank 170 automatically issues a regular PIN and a panic PIN to the customer when the customer is issued a bank card 152. The customer may then be able to customize the regular PIN and/or the panic PIN by, for example, logging into the customer's account via the issuing bank's web page and typing in a PIN that the customer will be able to remember. In other embodiments, the issuing bank 170 issues only a regular PIN and requires that the customer take action to enroll in the panic PIN program before the customer can receive a panic PIN. The issuing bank 170 may provide documentation, videos, and/or other resources to instruct the customer about how to use the panic PIN and how the panic PIN process works.

As represented by block 310, the bank card machine 120 obtains account information and a PIN from a cardholder 150. For example, in one embodiment, the cardholder swipes a bank card 152 by a card reader 290, and the card reader 290 reads account information encoded on the card, such as on a magnetic strip or other machine-readable device. The bank card machine 120 then prompts the cardholder 150 to enter a PIN before allowing the cardholder to make a transaction using the bank card 152. For example, in one embodiment, the bank card machine 120 uses a display 230 to prompt the cardholder 150 to enter a PIN and the cardholder 150 may then use a touch screen and/or keypad 240 to enter a PIN. In another embodiment, such as where the cardholder 150 is attempting to make a transaction over a telephone, the cardholder 150 enters account information, such as a number on the bank card 152, using the keys on the telephone or by speaking into the telephone, the bank card machine 120 (e.g., a computer attached to the telephone network) then uses a speaker 250 to prompt the cardholder 150 to enter a PIN, and the customer 150 keys in or speaks a PIN.

As described above, in some instances, the cardholder 150 is the customer that owns the bank card 152, or is a person otherwise properly approved to use the bank card 152, and is attempting to make a transaction without being forced to by another person. In such instances, the cardholder 150 should provide the bank card machine 120 with the regular PIN 174 associated with the bank card 120. However, in other instances, the cardholder 150 is being forced to make the transaction for someone else. For example, the cardholder 150 may be the owner of the bank card 152 who, when approaching an ATM machine to make a transaction, is confronted by a criminal who then threatens the cardholder 150 with harm if the cardholder 150 does not withdraw money for the criminal. In such instances, the cardholder 150 should enter the panic PIN 176 to initiate the heightened security procedures described in greater detail below. In still other instances, the criminal forces the customer to give the bank card 152 and the bank card's PIN to the criminal, in which case the cardholder 150 at the bank card machine 120 would be the criminal. In such instances, the customer should give the criminal the panic PIN 176 so that, when the criminal attempts to make a transaction using the bank card 152 and the panic PIN 176, one or more of the heightened security procedures described below will be initiated.

As represented by block 315, the bank card machine 120 uses the account information and PIN received from the cardholder 150 to request approval for a transaction or otherwise request access to the customer's account. In one embodiment, the bank card machine 120 uses the account identification information obtained from the bank card 152 to identify the issuing bank 170 that maintains the account associated with the bank card 152. The bank card machine 120 then sends account identification information and the PIN received from the cardholder 150 to the issuing bank 170 via, for example, the network 110 and, in some cases, one or more other financial institutions such as a host processor 130.

As represented by block 320, the issuing bank compares the PIN received from the cardholder 150 to the regular PIN 174 and panic PIN 176 associated with the customer's account 172. More specifically, the issuing bank 170 uses the account identification information to determine the customer's account 172 for which access is requested. The issuing bank 170 then compares the received PIN to a regular PIN 174 associated with the account and to a panic PIN 176 associated with the account.

As represented by block 325, in one embodiment, the issuing bank 170 makes the comparison by asking itself whether the received PIN matches the panic PIN 176. In the illustrated embodiment, if the issuing bank 170 determines that the received PIN does not match the panic PIN 176, the issuing bank 170 asks itself whether the received PIN matches the regular PIN 174, as represented by block 330. In one embodiment, the procedures represented by blocks 325 and 330 are switched or are conducted simultaneously.

As represented by block 335, if the received PIN matches the regular PIN 174, the issuing bank 170 approves the transaction or otherwise allows regular access to the customer's account 172. In this regard, the issuing bank 170 may return an authorization code to the bank card machine 120 via the network 110 and/or one or more other financial institutions, such as the host processor 130 or its bank 135.

As represented by block 340, if the received PIN does not match either the regular PIN 174 or the panic PIN 176, the issuing bank 170 indicates to the bank card machine 120 that an incorrect PIN has been entered and/or refuses access to the customer's account 172. In one embodiment, the bank card machine 120 allows the cardholder one or more additional attempts to provide a PIN that matches the regular PIN 174 or the panic PIN 176.

Figure 4:
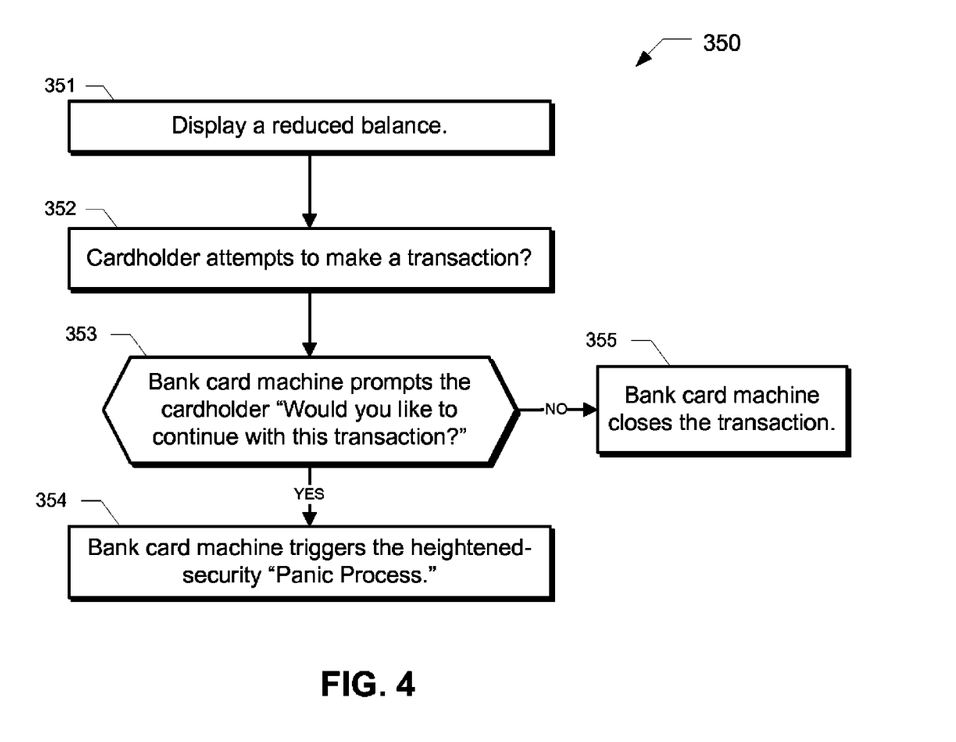
FIG. 4 provides a flow diagram illustrating a procedure for verifying that a "panic" personal identification code was intended to be entered, in accordance with an embodiment of the invention.

If the received PIN matches the panic PIN 176 associated with the account 172, a panic PIN process is initiated. As represented by block 350, in some embodiments, the panic PIN process begins with a verification process to determine if the cardholder 150 intended to enter the panic PIN 176 and did not do so accidently. FIG. 4, described in greater detail below, illustrates an exemplary process for verifying that the cardholder 150 intended to enter the panic PIN 176. This procedure, however, might not be used in some embodiments of the invention.

As represented by block 360, if the received PIN matches the panic PIN 176 and a verification process does not negate the entry of the panic PIN 176, the bank card machine 120, issuing bank 170, and/or other parties perform the heightened-security "Panic Process." The panic process generally involves one or more processes that are directed at preventing a fraudulent transaction from taking place, limiting the damage that could be caused by the fraudulent transaction, and/or identifying and apprehending the person attempting to make the fraudulent transaction or other crime.

Blocks 361 through 370 illustrate exemplary procedures that are undertaken in some embodiments of the invention during the panic process. Some of these procedures may be performed by the issuing bank 170, while others may be performed by the bank card machine 120, the bank card machine owner/holder 140, the bank card machine owner/holder's bank 145, the host processor 130, the host processor's bank 135, and/or other parties involved in the attempted fraudulent transaction. In this regard, any of these parties may include computer-readable medium having computer-readable program code stored therein for performing these procedures in response to an indication that a panic PIN has been entered or that the transaction may be fraudulent. Furthermore, in some embodiments, the issuing bank 170 sends an indication to one or more of these parties to inform them that they should initiate their own panic process, if they have one, with regard to this transaction.

As represented by block 361, in one embodiment, the bank card machine 120 provides a reduced balance to the cardholder 150, i.e., a balance lower than the actual balance of the customer's account 172. For example, in one embodiment, the bank card machine 120 displays the reduced balance on its display 230. It is hoped that, by this action, the criminal will either think that the balance is too low to justify continuing with the crime, or will only try to withdraw a smaller amount of money from the account. In one embodiment, the issuing bank 170 sends the bank card machine 120 reduced balance information to display to the cardholder 150 in response to receipt of the panic PIN 176. In other embodiments, however, the bank card machine 120 or the host processor 130 decides to display a balance lower than the balance information received from the issuing bank 170 in response to receiving an indication from the issuing bank 170 that a panic process should be performed.

As represented by block 362, in one embodiment, the bank card machine 120 turns on a microphone 245 or records a higher volume or resolution audio. Such information could be useful to determine what happened during the transaction, if the transaction is/was in fact fraudulent, and to help apprehend the criminal. In one embodiment, the audio received by the microphone 245 is provided in a real-time or near-real-time feed to on-site security personnel 180, off-site personnel, the police or other security agency 190, and/or the like. In one embodiment, the bank card machine 120 or host processor 130 controls this process in response to receiving an indication from the issuing bank 170 that a panic process should be performed. In other embodiments, the issuing bank 170 controls the bank card machine 120 directly or issues it commands to perform this process in response to receiving the panic PIN 176.

As represented by block 363, in one embodiment, the bank card machine 120 distributes marked bills to the cardholder 150. For example, the marked bills may include bills having GPS (Global Positioning System) tracking devices, RFID tags, magnetic codes, UV-fluorescing "invisible" ink codes, infrared codes, catalogued serial numbers, and/or other information that can be used to identify and/or track the bills. In this regard, in one embodiment, the bank card machine 120, such as an ATM, includes at least two cash cassettes or safes, one for holding marked bills and one for holding unmarked bills. The bank card machine 120 then distributes cash from the marked bills cassette or safe only during a panic process. In one embodiment, the bank card machine 120 or host processor 130 controls this process in response to receiving an indication from the issuing bank 170 that a panic process should be performed. In other embodiments, the issuing bank 170 controls the bank card machine 120 directly or issues it commands to perform this process in response to receiving the panic PIN 176. In embodiments where the marked bills include tracking devices like a GPS tracking device that allow for electronic tracking of the bills, a command center maintained by the issuing bank or one of the other parties may be configured to automatically track the bills after they are distributed by the ATM.

As represented by block 364, in one embodiment, the panic process causes the door(s) to the facility where the bank card machine 120 is located to lock, if the bank card machine 120 is located within a facility. This may be used to apprehend the criminal until the police or other security personnel arrive. In some instances, however, locking the doors may not be desirable if it would lock the customer in the facility with the criminal. In one embodiment, the system uses imaging techniques to automatically decipher images from the bank card machine's camera 280 or other facility cameras to determine if there is only one person in the facility. In such an embodiment, if there is more than one person in the facility, the doors are not locked. In one embodiment, the bank card machine 120, host processor 130, or bank card machine owner/holder 140 controls this process in response to receiving an indication from the issuing bank 170 that a panic process should be performed. In other embodiments, the issuing bank 170 controls the facility doors directly or issues the facility commands to perform this process in response to receiving the panic PIN 176. In still other embodiments, the bank card machine 120, host processor 130, and/or the issuing bank 170 are configured to stall the transaction for some time in response to a panic PIN in order to provide increased time for security to arrive.

As represented by block 365, the panic process involves signaling a cashier or teller to require more identification. For example, where the bank card machine 120 is a POS terminal, the cash register display may prompt the cashier to ask for a driver's license or other picture identification if a panic PIN is entered at the POS terminal. The cashier or teller may be signaled directly by the issuing bank 170 in response to the receipt of the panic PIN 176, or by any of the other parties involved in the transaction in response to the other party receiving an indication from the issuing bank 170 that a panic process should be performed.

As represented by block 366, in one embodiment, the panic process involves automatically turning on a camera 280 at the bank card machine 120 and/or recording a higher resolution image, zooming in or out, recording a wider angle image, recording a different type of image (e.g., a night-vision image), or the like at the bank card machine 120 in response to the panic PIN 176. The image may include a still image or a video image. Such imaging information could be useful to determine what happened during the transaction, if the transaction is/was in fact fraudulent, and to help apprehend the criminal. In one embodiment, the images received by the camera 280 are provided in a real-time or near-real time feed to on-site security personnel 180, off-site personnel, the police or other security agency 190, and/or the like. In one embodiment, the bank card machine 120 or the facility at which it is located, automatically increases the lighting in the vicinity of the bank card machine 120 to improve the quality of the captured image and/or to deter the criminal from proceeding. In one embodiment, the bank card machine 120 or host processor 130 controls this process in response to receiving an indication from the issuing bank 170 that a panic process should be performed. In other embodiments, the issuing bank 170 controls the bank card machine 120 directly or issues it commands to perform this process in response to receiving the panic PIN 176.

As represented by block 367, in one embodiment, the panic process involves contacting on-site security personnel 180, the police, and/or other security agencies 190 and informing them that a crime is taking place at the bank card machine 120. In one embodiment, this is done automatically by a computer located at the issuing bank 170, the bank card machine 120, and/or the other locations illustrated in FIG. 1, in response to an indication that a panic PIN 176 has been entered at the bank card machine 120.

As represented by block 368, in one embodiment, the bank card machine 120 indicates that the bank card machine 120 is out of order. For example, the display 230 on the bank card machine 120 may display "out of order." In one embodiment, this is done automatically by bank card machine 120 or a party controlling the bank card machine 120, such as the host processor 130 or the issuing bank 170, in response to the panic PIN 176 being entered at the bank card machine 120. In one embodiment, the bank card machine 120 indicates that it is out of order shortly after the panic PIN 176 is entered, to prevent the criminal from withdrawing money. In another embodiment, the bank card machine 120 indicates that it is out of order after the fraudulent transaction takes place, so as to prevent others from using the bank card machine 120 after the fraudulent transaction has occurred and until a security or investigative agency can arrive to collect evidence from the bank card machine 120 and its vicinity.

As represented by block 369, in one embodiment, the issuing bank 170, the bank card machine 120, the host processor 130, the host processor's bank 135, the bank card machine owner/holder 140, the bank card machine owner/holder's bank 145, and/or other parties involved in the transaction automatically flag the transaction in their records as being potentially fraudulent and/or notify other parties involved in the transaction and/or within the organization of the fraudulent transaction as it is taking place, or after it has taken place.

As represented by block 370, in one embodiment, the panic process involves indicating to the cardholder 150 that the daily withdrawal/purchase limit has been reached when, in fact, it has not. For example, in one embodiment, the bank card machine 120 displays that the limit has been reached immediately to prevent the fraudulent purchase or cash withdrawal from taking place. In other embodiments, the bank card machine 120 allows a certain sized purchase or a certain amount of money to be withdrawn but lowers the regular maximum limit to some other reduced limit in order to limit the amount of financial damage the transaction can cause, while at the same time preventing the criminal from physically harming the customer. In one embodiment, the issuing bank 170 sets this reduced transaction limit, while in other embodiments, the bank card machine 120, the host processor 130, the bank card machine owner/holder 140, their respective banks, and/or other institutions involved in the transaction determine the lower transaction limit automatically in response to an indication that a panic PIN 176 has been entered.

As represented by block 371, in some embodiments the bank card machine 120, or other devices or parties involved in the bank card transaction process, performs delay tactics in response to a panic PIN 176 being entered in order to buy time until the police or other security personnel arrive. In one exemplary embodiment the delay tactics involve requiring that the cardholder perform additional identification steps. In other embodiments, the bank card machine 176 or other devices or parties involved in the transaction perform each of several steps in the process more slowly than normal to delay the process significantly without the appearance of a long delay in any one particular step.

In another embodiment (not shown), the panic process may involve sounding an alarm at the bank card machine 120. However, in one embodiment, the bank card machine's reaction and the reaction of other parties in the panic process are specifically configured to obtain increased information about the criminal and the transaction, prevent the fraudulent transaction, and limit damage from the fraudulent transaction, while at the same time allowing the criminal to believe that he or she is using the correct PIN. In this way, the panic PIN 176 is intended to improve security and limit damage while at the same time trying to protect the safety of the customer, who the criminal may threaten with significant harm if the PIN is not correct. As such, in some embodiments, sounding an alarm in the vicinity of the bank card machine 120 may not be desirable or performed.

FIG. 4 provides a flow diagram illustrating a procedure 350 for verifying that a "panic" PIN was intended to be entered, in accordance with an embodiment of the invention. In general, the verification procedure 350 is configured to provide an indication to a customer, if the customer is the cardholder 150, that the customer has entered a panic PIN 176, but is configured to do so in a way that will not let the criminal know that the customer has entered a panic PIN 176 instead of a regular PIN 174. In one embodiment, the verification procedure 350 is performed by the bank card machine 120, while in other embodiments, the issuing bank 170 or another entity involved in the transaction performs the verification procedure 350 and merely uses the bank card machine 120 as a tool to interact with the cardholder 150.

For example, the embodiment of the verification procedure 350 illustrated in FIG. 4 involves presenting, in response to the receipt of the panic PIN 176, the cardholder 150 with reduced balance information, such as by displaying the reduced balance on the display 230 of the bank card machine 120, where the reduced balance is significantly lower than the customer's actual balance. A customer of the issuing bank 170, who is the proper owner of the bank card 152 and who has been instructed to use the panic PIN 176, should recognize that the displayed balance information is incorrect and then recall that this is the way that the panic process informs the customer that a panic PIN has been entered.

As represented by block 352, the cardholder 150 then attempts to make a transaction using the bank card machine 120. As represented by block 353, the bank card machine 120 then prompts the cardholder 150 to decide whether the cardholder 150 would like to continue with the requested transaction. A cardholder 150 that is the rightful card owner, who identified that the displayed balance was significantly lower than the customer's actual balance, and who did not intend to enter a panic PIN 176, would then answer "no" and the bank card machine 120 would close the bank card transaction, as represented by block 355. The cardholder 150 could then restart the transaction, remembering to input the regular PIN 174. However, if the cardholder 150 did intend to enter the panic PIN 176 since the cardholder 150 is being forced to make the transaction or if the cardholder 150 is a criminal that was told the panic PIN 176 instead of the regular PIN 174, then the cardholder 150 would answer "yes" and the bank card machine 120, and/or other entity involved in the transaction, would trigger the heightened-security panic process, such as the one described above in relation to FIG. 3, as represented by block 354.

As will be appreciated by one of skill in the art, the present invention may be embodied as a method, system (including an apparatus), computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system."

Furthermore, embodiments of the present invention may take the form of a computer program product comprising a computer-readable storage medium having computer-usable program code/computer-readable instructions embodied in the medium. Any suitable computer-readable medium may be utilized. The computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-readable medium may be any medium that can contain, store, communicate, propagate, or transport the program for use by or in connection with the instruction execution system, platform, apparatus, or device. The computer-readable instructions may be transmitted using any appropriate medium, including but not limited to the Internet, wireline, optical fiber cable, radio frequency (RF), or the like.

Computer-readable instructions for carrying out operations of the present invention may be written in an object-oriented, scripted or unscripted programming language such as Java, Perl, Smalltalk, C++, or the like. However, the computer-readable instructions for carrying out operations of the invention may also be written in conventional procedural programming languages, such as the "C" programming language or similar programming languages.

Embodiments of the present invention are described above with reference to flowchart illustrations and/or block diagrams of methods, apparatuses (systems) and computer program products, according to embodiments of the invention. It will be understood that each block of the flowchart illustrations and/or block diagrams shown in FIGS. 3 and 4, and combinations of blocks in the flowchart illustrations and/or block diagrams, can be implemented by computer-readable instructions. These computer-readable instructions may be provided to a processor of a general purpose computer, a special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer-readable program instructions may also be stored in a computer-readable memory that can direct a computer or other programmable data processing apparatus to function in a particular manner, such that the instructions stored in the computer-readable memory produce an article of manufacture including instruction mechanisms which implement the function/act specified in the flowchart and/or block diagram block or blocks.

The computer-readable program instructions may also be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer-implemented method comprising:
   receiving account identification information;
   receiving a personal identification code from a user of a bank card machine;
   using the account identification information to identify a bank account;
   determining whether the received personal identification code matches a first personal identification code associated with the bank account;
   performing a verification procedure to determine whether the user intended to enter a personal identification code that matches the first personal identification code, if it is determined that the received personal identification code matches the first personal identification code, wherein performing the verification includes,
   displaying a reduced balance that is significantly lower than the actual balance of the bank account, and
   determining that the user intended to enter the personal identification code that matches the first personal identification code if the user continues with a transaction after the reduced balance is displayed; and
   initiating one or more fraud protection procedures, if it is determined that the received personal identification code matches the first personal identification code and if it is determined through the verification procedure that the user intended to enter a personal identification code that matches the first personal identification code.

2. The computer-implemented method of claim 1, wherein performing the verification procedure further comprises asking the user, after the displaying of the reduced balance, if the user would like to continue with the transaction.

3. The computer-implemented method of claim 1, further comprising:
   determining whether the received personal identification code matches a second personal identification code; and
   allowing standard user access to the bank account if the personal identification code matches the second personal identification code and does not match the first personal identification code.

4. The computer-implemented method of claim 1, wherein the one or more fraud protection procedures comprise displaying a reduced balance.

5. The computer-implemented method of claim 1, wherein the one or more fraud protection procedures comprise communicating an account balance that is different than the bank account's actual balance.

6. The computer-implemented method of claim 1, wherein the one or more fraud protection procedures comprise distributing marked bills.

7. The computer-implemented method of claim 1, wherein the one or more fraud protection procedures comprise distributing a GPS tracking device.

8. The computer-implemented method of claim 1, wherein the one or more fraud protection procedures comprise signaling to a cashier or teller to require additional identification.

9. The computer-implemented method of claim 1, wherein the one or more fraud protection procedures comprise contacting a security person or agency.

10. The computer-implemented method of claim 1, wherein the one or more fraud protection procedures comprise instituting a reduced transaction limit.

11. The computer-implemented method of claim 1, wherein the one or more fraud protection procedures comprise activating a security camera, activating a zoom feature of a security camera, reorienting a security camera, or recording higher resolution images from a security camera.

12. The computer-implemented method of claim 1, wherein the one or more fraud protection procedures comprise feeding images from a security camera to a device configured to display the images in real time or near real time.

13. The computer-implemented method of claim 1, wherein the one or more fraud protection procedures comprise activating a microphone.

14. The computer-implemented method of claim 1, wherein the one or more fraud protection procedures comprise displaying that a bank card machine is out of order.

15. The computer-implemented method of claim 1, further comprising:
receiving a transaction request, wherein the one or more fraud protection procedures comprise flagging the transaction as being potentially fraudulent.

16. The computer-implemented method of claim 1, wherein receiving account identification information and the personal identification code comprises:
receiving account identification information and the personal identification code from a remote bank card machine.

17. The computer-implemented method of claim 1, wherein the method is performed by a financial institution that maintains the bank account.

18. The computer-implemented method of claim 1, wherein the method is performed by a bank card machine.

19. The computer-implemented method of claim 1, wherein receiving account identification information comprises reading a machine-readable code provided by a bank card, and wherein receiving a personal identification code comprises receiving input from a bank card machine's user input device.

20. A system comprising:
a communication interface communicably coupled to a bank card machine and configured to receive bank card information and a personal identification code from the bank card machine;
a memory device comprising information about a plurality of bank accounts, wherein the information for one or more of the bank accounts includes account identification information and a first personal identification code; and
a computing processor operatively coupled to the communication interface and the memory device, wherein the processor is configured to identify a bank account from the plurality of bank of accounts based on the received bank card information and determine whether the received personal identification code matches the first personal identification code associated with the bank account, wherein the processor is further configured, if it is determined that the received personal identification code matches the first personal identification code, to display a reduced balance that is significantly lower than the actual balance of the bank account and determine that a user intended to enter the personal identification code that matches the first personal identification code if the user continues with a transaction after the reduced balance is displayed, and wherein the processor is configured to initiate one or more fraud protection procedures, if it is determined that the received personal identification code matches the first personal identification code and if it is determined through the verification procedure that the user intended to enter a personal identification code that matches the first personal identification code.

21. The system of claim 20, wherein the processor is further configured to query the user, after the displaying of the reduced balance, if the user would like to continue with the transaction.

22. The system of claim 20, wherein the processor is further configured to initiate the fraud protection procedure that includes displaying a reduced balance.

23. The system of claim 20, wherein the processor is further configured to initiate the fraud protection procedure that includes communicating an account balance that is different than the bank account's actual balance.

24. The system of claim 20, wherein the processor is further configured to initiate the fraud protection procedure that includes instituting a reduced transaction limit.

25. The system of claim 20, wherein the processor is further configured to initiate the fraud protection procedure that includes displaying that a bank card machine is out of order.

* * * * *